United States Patent [19]
Ward, III et al.

[11] 3,925,037
[45] Dec. 9, 1975

[54] HIGH PRESSURE MEMBRANE PACKAGE CONSTRUCTION

[75] Inventors: William J. Ward, III, Schenectady; William I. Foss, Burnt Hills, both of N.Y.

[73] Assignee: General Electric Company, Schenectady, N.Y.

[22] Filed: Feb. 4, 1974

[21] Appl. No.: 439,431

[52] U.S. Cl. .................. 55/158; 156/253; 210/321
[51] Int. Cl.² ........................................ B01D 13/00
[58] Field of Search ........ 55/16, 158; 156/253, 289, 156/291, 299; 210/22, 23, 321, 445–447, 499

[56] References Cited
UNITED STATES PATENTS

| | | | |
|---|---|---|---|
| 3,238,704 | 3/1966 | Straschil et al. | 55/158 |
| 3,382,985 | 5/1968 | Muehl | 210/499 X |
| 3,447,286 | 6/1969 | Dounoucos | 55/158 X |
| 3,471,019 | 10/1969 | Trasen et al. | 210/445 X |
| 3,564,819 | 2/1971 | Neulander et al. | 55/158 |
| 3,661,721 | 5/1972 | Rodgers | 55/158 X |
| 3,793,111 | 2/1974 | Judkins | 55/158 X |
| 3,797,202 | 3/1974 | Neulander et al. | 55/158 |

*Primary Examiner*—Charles N. Hart
*Assistant Examiner*—Robert H. Spitzer
*Attorney, Agent, or Firm*—Leo I. MaLossi; Joseph T. Cohen; Jerome C. Squillaro

[57] ABSTRACT

Improved membrane package construction is shown in which non-porous, rigid embedment is provided for the edges of each membrane and the membrane surface area immediately adjacent each manifold location. In addition, for construction embodying immobilized liquid membranes, all edges of each membrane assembly and surface area immediately adjacent the edges are similarly embedded. It has been found that pressure differences of at least 300 psi between feed and sweep gases can be accommodated with the improved construction of this invention.

8 Claims, 3 Drawing Figures

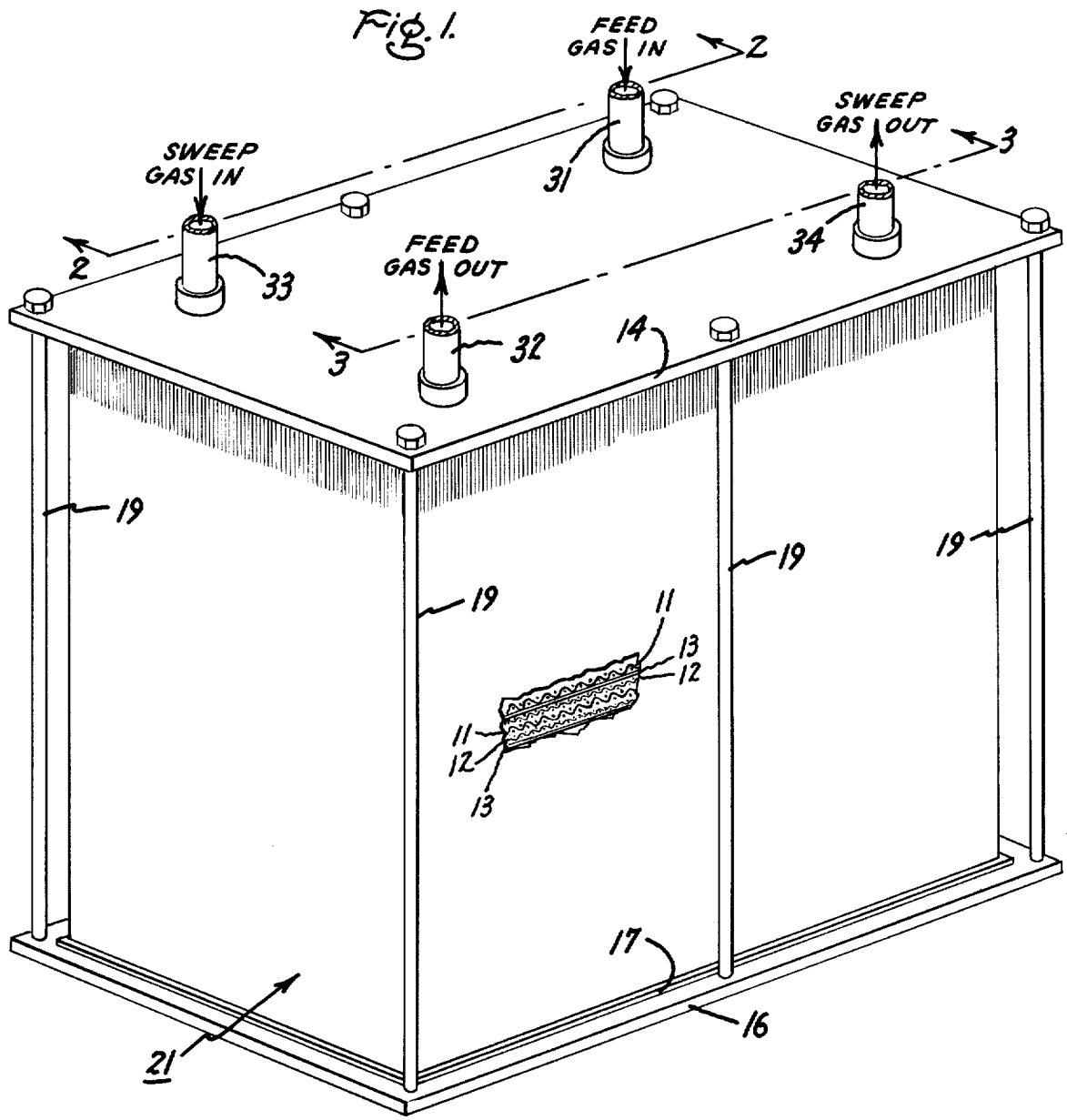

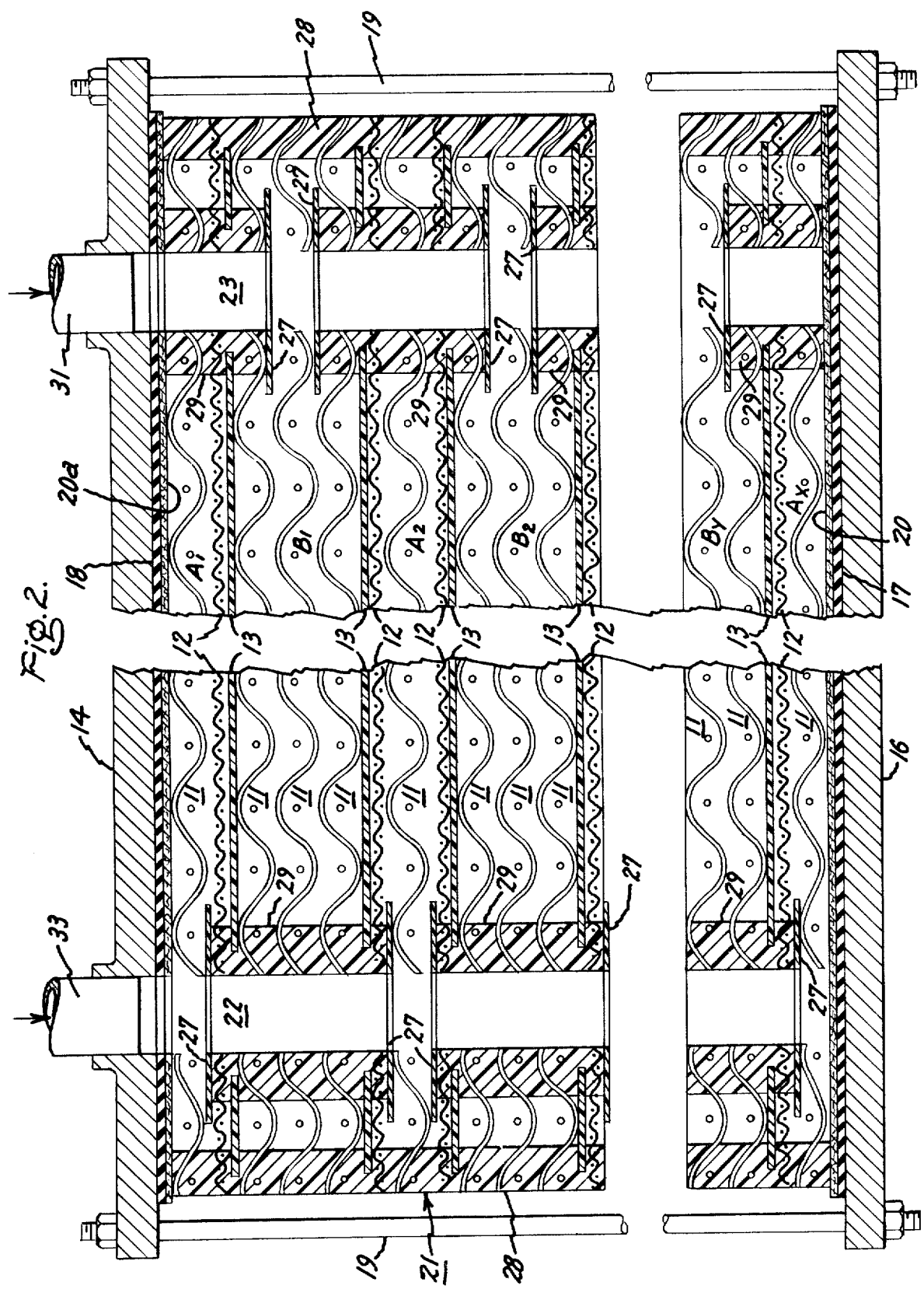

U.S. Patent   Dec. 9, 1975   Sheet 3 of 3   3,925,037
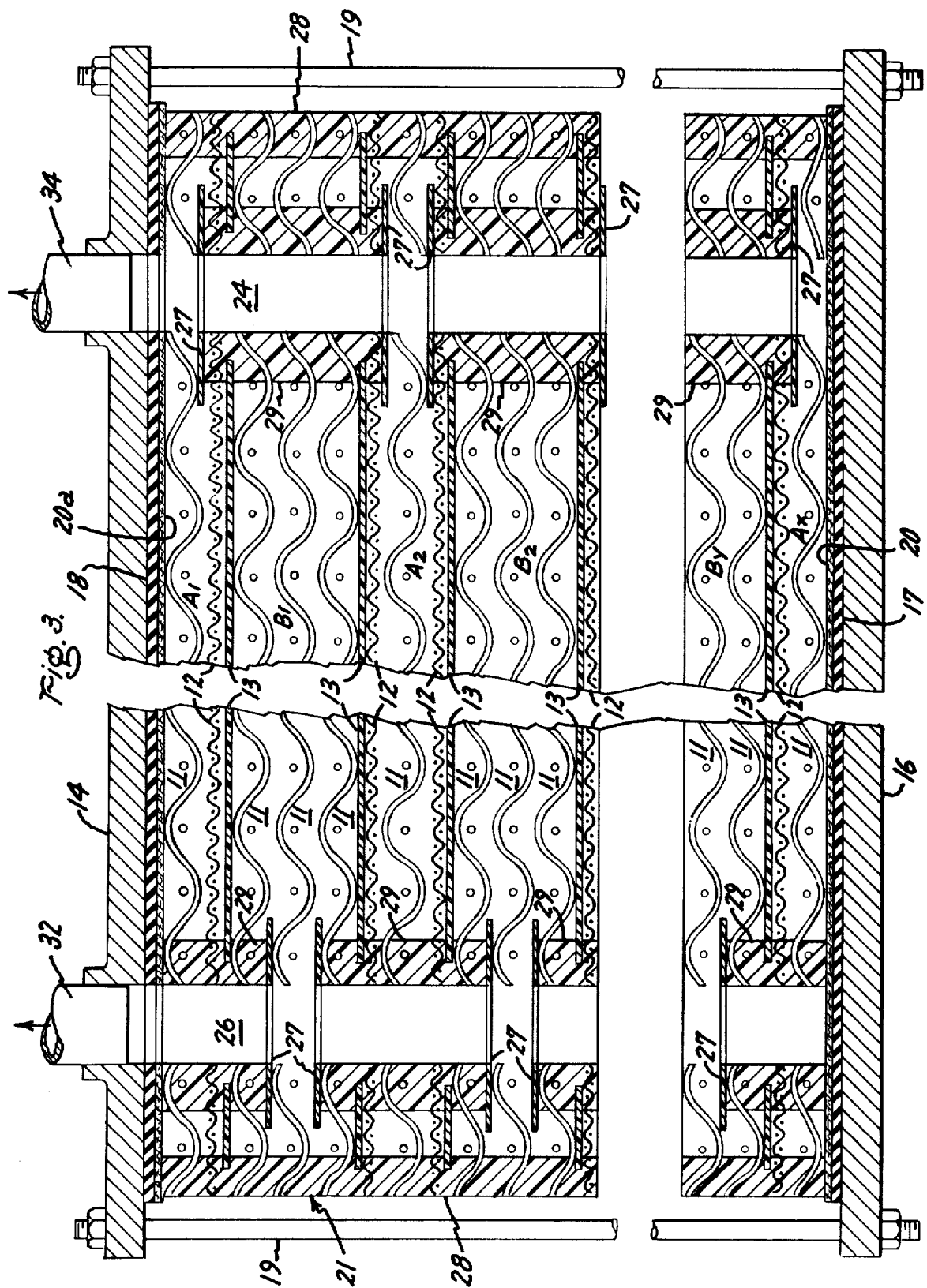

HIGH PRESSURE MEMBRANE PACKAGE CONSTRUCTION

BACKGROUND OF THE INVENTION

U.S. Pat. No. 3,564,819 — Neulander et al. (incorporated by reference) discloses a packaged membrane device, which consists of a plurality of spaced membranes disposed in substantially parallel surface-to-surface array so as to define both a first group of flow volumes and a second group of flow volumes. The members of the second group are disposed in alternating relationship with the members of the first group. Each flow volume contains membrane-spacing means (e.g., a woven screen). The distribution of separate flow of fluid to and from each group of flow volumes is facilitated by a plurality of discontinuous channels having gas-tight walls that extend transversely between adjacent membranes. Each channel places a pair of adjacent flow volumes of the same group in flow communication and the gas-tight wall of each channel bonds together the portion of the spacing means embedded therein and the portions of the membranes located at each end of the wall. Each series of vertically aligned channels comprises a manifold.

U.S. Pat. Application Ser. No. 236,276 — Judkins (now U.S. Pat. No. 3,793,111, incorporated by reference) is assigned to the assignee of the instant invention and discloses an improved process for the preparation of membrane package construction having the discontinuous manifolding feature of the Neulander et al patent. According to the Judkins process, confined areas of fluid sealant and a continuous peripheral bead of fluid sealant are disposed on each flat screen separator as the screen separator is incorporated into the stack alternately with the membrane sheets.

Membrane package construction embodying the discontinuous manifolding feature referred to hereinabove has successfully provided the capability for minimizing membrane packaging volume. However, it has been found that when such membrane package constructions are utilized as high pressure systems (e.g., encountering pressure differences of at least about 30 psi) leakage is frequently encountered.

DESCRIPTION OF THE INVENTION

In accordance with this invention membrane package construction according to the Neulander et al and Judkins methods is improved by the provision of nonporous, rigid embedment for those edges of each membrane and the membrane surface area disposed immediately adjacent each manifold location. In addition, for package construction embodying immobilized liquid membranes, all edges of each membrane assembly and surface area thereof immediately adjacent the edges are similarly embedded. As a result, a high pressure membrane package construction is produced having leak-tight manifolds.

The terms "pad," "fluid" and "membrane assembly" are defined below as these terms are employed herein:
  pad: a quantity (of liquid resin) deposited over and embedding itself into an area of screen, this quantity merging with earlier and/or later applied pads;
  fluid: indicating that though the material may be quite viscous it can be made to flow;
  membrane assembly: a single permselective membrane or a permselective membrane plus microporous support therefor.

Other aspects and advantages of this invention will become apparent from consideration of the following portion of the specification setting forth, together with the annexed drawing, the preferred embodiment of the invention. In the drawing:

FIG. 1 is a three dimensional view of a membrane package in which the instant invention may be employed;

FIG. 2 is a sectional view taken on line 2—2 of FIG. 1 and

FIG. 3 is a sectional view taken on line 3—3 of FIG. 1.

MANNER AND PROCESS OF MAKING AND USING THE INVENTION

In order to provide both rigid embedment for the cut edges of each membrane at each manifold location and, as well, to provide for the passage of gas from the manifolds to the flow volumes, at least three layers of separator screen are disposed between adjacent membranes. Also, holes through the membranes at the manifold locations are pre-cut or pre-punched to a larger diameter than the diameter of the completed manifold that is to pass through these aligned holes. Means are employed to control the flow of the embedment material to prevent inadvertent sealing off during assembly of avenues of flow communication between each manifold and the flow volumes serviced thereby.

The membrane package is assembled by placing a first screen upon a solid endplate. A narrow bead of liquid resin material is placed around the periphery of this screen and, as well, pads thereof are placed at the feed manifold location. The area covered by the pads of resin material at the manifold locations will be of sufficient diameter so that after the resin has set and a hold is drilled therethrough, a non-porous, gas-tight annular wall will remain. A thin solid disc is then placed over each sweep manifold location to prevent the movement of after-applied resin material into the first screen. A second screen is then added to the stack, the bead of peripheral resin is placed thereon and a quantity of the resin material is placed at all manifold locations. The first pre-punched membrane is then added to the stack contacting the peripheral bead and the four pads of resin material previously applied. Assembly of the stack proceeds layer by layer, each screen receiving a narrow bead of the resin material, which gradually builds up the outer wall structure. By applying pads of resin material at appropriate locations (feed manifolds and/or sweep manifolds) on each screen as it is added to the assembly, the structures required for production of the manifolds (after curing of the resin) are made available. When the appropriate number of layers of screening and membrane have been added to the stack as described, the stack is capped off by a second solid endplate and permitted to cure. Holes are cored out for the sweep and feed manifolds and then the completed package is placed (with appropriate gasketing) between pressure plates, firmly bolted together and leak checked.

If desired the completed package may be contained in a pressure vessel instead of between pressure plates.

The instant invention may be applied to the preparation of gas separation devices, gas concentrator devices, blood oxygenators, dialysis units, heat exchangers, etc. Utilization thereof for the preparation of gas separation devices will be decribed by way of example.

Materials for construction of the packaged membrane device are conventional construction materials previously employed in the Neulander et al. and the Judkins patents. Preferably, the separator screens are of woven screen material e.g., polyester or nylon monofilament screen cloth having mesh openings in the range of about 400 microns to about 1200 microns and an open area ranging from about 45 to 55 per cent. Other sizes of mesh openings, percentages of open area and combinations of screens may be used depending upon the strength of the membranes employed, the pressure difference prevailing across the membrane and the criteria to be set for fluid flow through the screens. Screens prepared from other materials may be employed so long as the material is capable of retaining its structural integrity under the operating conditions and is compatible with the fluids employed.

This liquid material to be applied to the separator screens for buildup of unified walls to define the manifold structures and unified exterior walls to define the flow volumes is specifically selected to have the following properties:

a. it must wet the membrane surface,
b. it must wet and form an adhesive bond with the membrane material and adhere thereto when wet,
c. it must be a viscous liquid containing little or no diluent,
d. it must be chemically inert to the materials with which it must come into contact,
e. it must be self-setting to a hard rigid state about 20°—30°C and
f. it must set as a non-porous barrier (capable of preventing the flow of gas therethrough in those constructions in which gas separations are to be effected).

An example of a suitable hard epoxy resin is a bisphenol-A based epoxy resin to which has been added a catalyst system consisting of a modified polyamine plus polyamide.

The term "epoxy" is defined in "A Handbook of Common Polymers" — W. L. Roff (Butterworth's Scientific Publication, Table 33, page 207, 1956). Those epoxies that cure to a hard material are preferred. Other useful materials are cross-linked polyesters and phenolic resins (phenyl formaldehydes).

In a gas separation device imperforate membranes that permit certain specific gases or vapors to pass therethrough to the substantial exclusion of others would be employed. The preparation of such membranes is disclosed in U.S. Pat. No. 3,396,510 — Ward et al; U.S. Pat. No. 3,335,545 — Robb et al. and U.S. Pat. No. 3,325,330 — Robb, for example. Excellent capability for resisting pressure differential has been obtained with immobilized liquid members in which the liquid is lodged in the pores of a microporous layer made of a material wet by the liquid used. By way of example, an immobilized liquid membrane was prepared by introducing 30% $K_2CO_3$ solution into a 50 micron thick sheet of the cellulose membrane material sold under the trademark Cuprophan (Enka Co., Wuppertal, West Germany).

Other membrane materials useful as immobilizing mediums for various liquids wet thereby include the ultrafine porous polymer membrane disclosed in U.S. Pat. Application Ser. No. 127,848 — Weininger et al. (filed Mar. 24, 1971 and assigned to the assignee of the instant invention) and the materials described in U.S. Pat. Nos. 3,378,057 — Sargent et al.; 2,984,869 — Honey et al.; 3,351,489 — Larson et al.; 3,216,882 — Feldt et al. and 3,062,760 — Dermody el al. The disclosures of the aforementioned patent application and patents are incorporated herein by reference in their entirety.

Membrane packages prepared according to the method of this improved invention have been operated without leakage with pressure differentials between feed and sweep gases of as much as 300 psi for gas separations.

DESCRIPTION OF THE PREFERRED EMBODIMENT

The completed device shown in FIG. 1 is partially cut away to display the repetitive stack arangement comprising coarse screening 11, fine screening 12 and membrane (or membrane assembly) 13. The arrangement of the individual layers separating membranes 13 is more clearly seen in FIGS. 2 and 3. The membrane assembly typically employed in the case of an immobilized liquid membrane (ILM) is prepared by impregnating a porous membrane (e.g., Cuprophan cellulose) with a desired solution (e.g., 30% $K_2CO_3$ solution) and then supporting this ILM on one or more layers of microporous materials such as ploypropylene (e.g. Celgard Celanese Corporation of America). After assembly and curing of the membrane package, the package is sandwiched between metal endplates 14, 16 and gaskets 17, 18. Fasteners 19 arranged around the perimeter of the device provide biasing force for the endplates.

Preferably, the first and last laminae 20, 20a of the membrane package 21 are of solid sheet, e.g., glassfiber reinforced board or sheet metal to provide stiffness and protection of the package. When employed, such stiffener sheets become an integral part of the package.

As shown in FIGS. 2 and 3, membrane assemblies 13 define flow channels $A_1, A_a \ldots A_x$ alternating with flow channels $B_1, B_2 \ldots B_y$. The former set of flow channels accommodate the sweep gas at low pressure and the latter set of channels accommodate the feed gas at high pressure.

Preferably, the woven polyester screens employed are coarse screens (e.g., 24 mils) and fine screens 12 (e.g., 8 mils). The fine screens 12 are disposed on the low pressure side of each membrane 13.

The intermediate flow channels accommodating the sweep gas is shown consisting of one coarse screen 11 disposed between a pair of fine screens 12. Each of the flow channels accommodating the feed gas is shown consisting of three coarse screens 11.

Before stacking the separator screens 11, 12 and membrane assemblies 13, the membrane assemblies 13 are pre-punched at each manifold location with first holes having a diameter significantly larger than the diameter of the sweep and feed manifolds 22, 23, 24, 26 that will be cored (as second, or after-drilled, holes) out of the completed membrane package 21 as will be described hereinbelow. Also, the outside dimensions of each membrane assembly are cut slightly smaller than comparable dimensions of the screens. In this way, as the structure for each manifold and each outer wall of the device is built up during the stacking procedure no edge of the membrane of microporous support therefor will be exposed to contact with the gas flow and every edge will be completely restrained by the cured resin material to prevent any tendency of the package to come apart at these points. Also, preferably the screens have pre-marked lines defining locations for the deposit of the resin material thereon.

In the assembly of the several components, a separator screen (e.g., screen 11) is placed on the flat surface of glass-filled epoxy endplate 20 and a narrow bead of liquid epoxy resin is laid down around the perimeter of screen 11. Also, a pad of epoxy resin is placed on the screen at each of the two feed manifold locations. The sweep manifold structure locations are protected by laying a disc 27 of thin plastic material on screen 11 at each of these locations. The diameter of disc 27 is preferably about twice the diameter of the pre-punched holes in membranes 13. Fine screen 12 is then placed down over screen 11. Screen 12 (and each screen subsequently added to the stack) receives a narrow bead of liquid epoxy resin around the perimeter thereof and, as well, a pad of epoxy resin at each appropriate manifold location. Thus, as may be seen in FIGS. 2 and 3 one set of screens will have pads at the feed manifold locations only, another set of screens will have pads at the sweep manifolds only, and still another set of screens will have pads at all manifold locations.

Flow of the epoxy placed along the perimeter and at the feed gas manifolds causes a merging with the previously deposited epoxy while at the sweep gas manifolds discs 27 prevent entry of the epoxy into screen 11 at these locations. Membrane assembly 13 is then laid down followed by coarse screen 11.

Thus, as the package assembly proceeds layer by layer in the pattern indicated in FIGS. 2 and 3, the sidewalls 28 of membrane package 21 are completed and strategically located masses 29 of epoxy resin (defined top and bottom by plastic sheets 27) are properly located for ultimate development of the manifold structure. After the epoxy resin has cured, a coring tool is used to core out passages 22, 23, 24 and 26 for ultimate development of the manifolding arrangement. As is shown in the drawings, these cored-out passages are of a significantly smaller diameter than the pre-punched holes in membrane assemblies 13 whereby the remaining wall portion of resin masses 28 that remain after the coring operation rigidly enclose and hold the edges of each hole in membrane assemblies 13. Each of holes 22, 23, 24 and 26 passes through each screen and through each mass 28 encountered to form the requisite vertical manifolding arrangement.

Also, when ILM's are employed, the outer dimensions of the membrane assemblies are slightly less than those of the screens to insure embedment of the outer edges thereof in the stiff, cured epoxy forming walls 28 as shown.

In operation a flow of feed gas entering through conduit 31 will pass via holes 23 in vertical alignment therewith between discs 27 to pass through alternate flow channels ($B_1$, $B_2$ etc.) comprising one flow volume group. This feed gas stream sweeps over the surfaces of membranes 13 forming the boundaries (top and/or bottom) of these flow channels on the way to exit via holes 26 forming part of the vertical manifold arrangement leading to conduit 32. Simultaneously, the sweep gas stream enters conduit 33 and passes via holes 22 in vertical alignment therewith into the second set of flow channels ($A_1$, $A_2$ etc.) in alternating arrangement with the other flow channel group. The sweep gas stream exits via holes 24 in the vertical manifold system leading to conduit 34.

Even though each first (pre-punched) hole in the membrane structures becomes filled with resin material during assembly, the identities of the first holes and edges thereof remain identifiable as such and are so recited in the claims.

What we claim as new and desire to secure by Letters Patent of the United States is:

1. A method for the preparation of a packaged membrane system comprising the steps of:
   a. pre-punching a plurality of first holes through each of a plurality of sheet-like membrane structures at similar locations thereon, the same number of said first holes being pre-punched through each membrane structure,
   b. arranging said membrane structures in a stack with a purality of sheet-like screen separators with each of said first holes in each membrane structure being in vertical alignment with first holes in membrane structures therebelow, at least three of said screen separators being disposed between adjacent membrane structures,
   c. applying on each of said screens prior to inclusion in said stack a continuous bead of uncured resin material adjacent the perimeter thereof and at least two pads of said resin material thereon, said pads each covering a larger area than the area of each of said first holes and each pad being located so as to be in vertical registry with first holes in vertical alignment in membrane structures disposed therebelow in said stack,
   d. said screens composing first, second and third sets, the total number of said pads on each screen of said first set being equal to the number of said first holes in each membrane structure and the total number of said pads on each screen of said second and third sets being less than the number of said first holes in each membrane structure, the pads being similarly located on each screen in said second set, the pads being similarly located on each screen in said third set and the pad locations being different for said second set than for said third set,
   e. the screens of said second and third sets being in alternating arrangement separated in each instance by a plurality of screens of said first set and a single membrane structure,
   f. placing adjacent each screen in said second and third sets means for preventing contact between such screens and pads of resin material as may be disposed immediately thereabove and therebelow, said preventing means being placed both in vertical registry with said first holes and adjacent locations on said such screens free of pads of resin material,
   g. permitting said resin material to cure in the stack of membrane structures, screens and preventing means and
   h. drilling second holes through said stack, said second holes being passed through vertical alignments of said first holes in said membrane structures, the disposition and size of said second holes relative to said first holes being such that resin material remains between the edge of each of said second holes and the edge of each of the first holes disposed therearound.

2. The method of claim 1 wherein deposits of the resin material cure as hard, rigid masses.

3. The method of claim 2 wherein each membrane structure consists of an immobilized liquid membrane.

4. The method of claim 2 wherein each membrane structure consists of an immobilized liquid membrane and microporous membrane support means therefor.

5. The method of claim 2 wherein each outer dimension of each membrane structure is made less than comparable outer dimensions of the screen separators.

6. In a packaged membrane system in which (a) a plurality of spaced membrane assemblies are disposed is substantially parallel surface-to-surface array to define both a first group of flow volumes and a second group of flow volumes alternating between said first group, (b) spacing means for the membrane assemblies is located in each of said flow volumes, (c) means are provided for simultaneously defining the periphery of each of said flow volumes and bonding together adjacent membrane assemblies and the spacing means located therebetween to form gastight peripheral walls and (d) means are provided for separate access to and egress from the plurality of flow volumes in said first group of flow volumes and in said second group of flow volumes, said access and egress means comprising a plurality of discontinuous channels, said channels being arranged in a plurality of sets with the channels in each set being in alignment and said channels having gas-tight walls extending transversely between adjacent membrane assemblies, each channel placing a pair of adjacent flow volumes of the same group in flow communication and the gas-tight wall of each channel bonding together the portion of the spacing means embedded therein and the portions of the membrane assemblies located at the far ends of said gas-tight walls, the improvement comprising:

1. each gas-tight wall extending through a hole in each of said membrane assemblies contacting said gas-tight wall, the edges of each of said holes in said membrane assemblies being rigidly embedded in said gas-tight walls.

7. The improvement recited in claim 6 in which the spacing means are screens and at least three screens are disposed between adjacent membrane assemblies.

8. The improvement recited in claim 7 in which the outer dimensions of each membrane assembly is shorter than the comparable outer dimension of the screens and the outer edges of each membrane assembly is rigidly embedded in the periphery-defining means.

* * * * *